(12) United States Patent
Bangalore Srinivas et al.

(10) Patent No.: US 12,128,554 B2
(45) Date of Patent: Oct. 29, 2024

(54) AUTONOMOUS MOBILE ROBOT WITH A SINGLE MODULAR PLATFORM

(71) Applicant: Tata Consultancy Services Limited, Mumbai (IN)

(72) Inventors: Venkatesh Prasad Bangalore Srinivas, Bangalore (IN); Venkat Raju Chintalapalli Patta, Bangalore (IN); Swagat Kumar, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 355 days.

(21) Appl. No.: 17/631,276

(22) PCT Filed: Jul. 23, 2020

(86) PCT No.: PCT/IB2020/056961
§ 371 (c)(1),
(2) Date: Jan. 28, 2022

(87) PCT Pub. No.: WO2021/019383
PCT Pub. Date: Feb. 4, 2021

(65) Prior Publication Data
US 2022/0258327 A1    Aug. 18, 2022

(30) Foreign Application Priority Data
Jul. 31, 2019   (IN) .............................. 201921031019

(51) Int. Cl.
*B25J 5/00*     (2006.01)
*B62D 61/10*    (2006.01)
(Continued)

(52) U.S. Cl.
CPC .............. *B25J 5/007* (2013.01); *B62D 61/10* (2013.01); *B62D 63/04* (2013.01); *B65G 1/1378* (2013.01)

(58) Field of Classification Search
CPC .......... B25J 5/007; B62D 61/10; B62D 63/04; B62D 63/02; B65G 1/1378
See application file for complete search history.

(56) References Cited

U.S. PATENT DOCUMENTS

| 7,991,505 B2 | 8/2011 | Lert, Jr. et al. |
| 9,550,624 B2 | 1/2017 | Khodl et al. |

(Continued)

FOREIGN PATENT DOCUMENTS

| CN | 105946451 A | * 9/2016 | ............. A61G 5/041 |
| CN | 107323194 A | * 11/2017 | |

(Continued)

OTHER PUBLICATIONS

International Search Report and Written Opinion mailed Nov. 26, 2020, in International Application No. PCT/IB2020/056961; 12 pages.

*Primary Examiner* — Lynn E Schwenning
*Assistant Examiner* — Lucia Elba Rodriguez
(74) *Attorney, Agent, or Firm* — Finnegan, Henderson, Farabow, Garrett & Dunner, L.L.P.

(57) ABSTRACT

An autonomous mobile robot (AMR) with a single modular platform to mount plurality of material handling units is provided. The AMR includes a monolithic chassis; a top plate includes plurality of standoffs to mount at least one material handling units; the plurality of standoffs are integrated on top of the top plate; drive wheels are coupled to a wheel mount as a single unit to form a drive wheel assembly; a suspension unit is coupled symmetrically in between two main bodies which corresponds to the monolithic chassis and the drive wheel assembly with spring enclosures, suspension shafts, and coil springs; a set of side plates connect the monolithic chassis on the AMR. The top plate is sandwiched between the plurality of standoffs and the monolithic chassis. A load is transferred from the plurality of material (Continued)

handling units through the plurality of standoffs and the top plate to the monolithic chassis.

17 Claims, 20 Drawing Sheets

(51) Int. Cl.
*B62D 63/04* (2006.01)
*B65G 1/137* (2006.01)

(56) References Cited

U.S. PATENT DOCUMENTS

| | | | |
|---|---|---|---|
| 10,434,924 B2 | 10/2019 | Alfaro et al. | |
| 10,668,617 B2 | 6/2020 | Jacobsen | |
| 11,199,853 B1 * | 12/2021 | Afrouzi | B25J 13/006 |
| 2004/0093650 A1 | 5/2004 | Martins et al. | |
| 2005/0029029 A1 | 2/2005 | Thorne | |
| 2018/0072212 A1 * | 3/2018 | Alfaro | B60P 1/52 |
| 2018/0093289 A1 * | 4/2018 | Raman | G05D 1/0234 |
| 2021/0031361 A1 * | 2/2021 | Morey | B25J 19/0029 |

FOREIGN PATENT DOCUMENTS

| | | |
|---|---|---|
| CN | 109015587 A | 12/2018 |
| DE | 102013106640 A1 | 1/2015 |
| KR | 20180072984 A | 7/2018 |
| WO | WO2008/149018 A2 | 12/2008 |
| WO | WO2015/035300 A1 | 3/2015 |
| WO | WO2017/121747 A1 | 7/2017 |
| WO | WO2018/047117 A1 | 3/2018 |
| WO | WO2018/068024 A1 | 4/2018 |

* cited by examiner

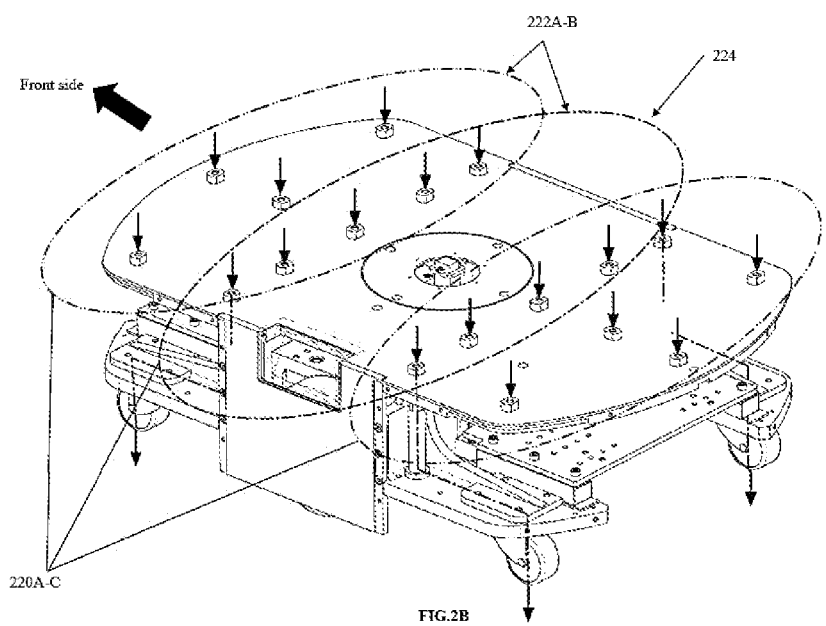

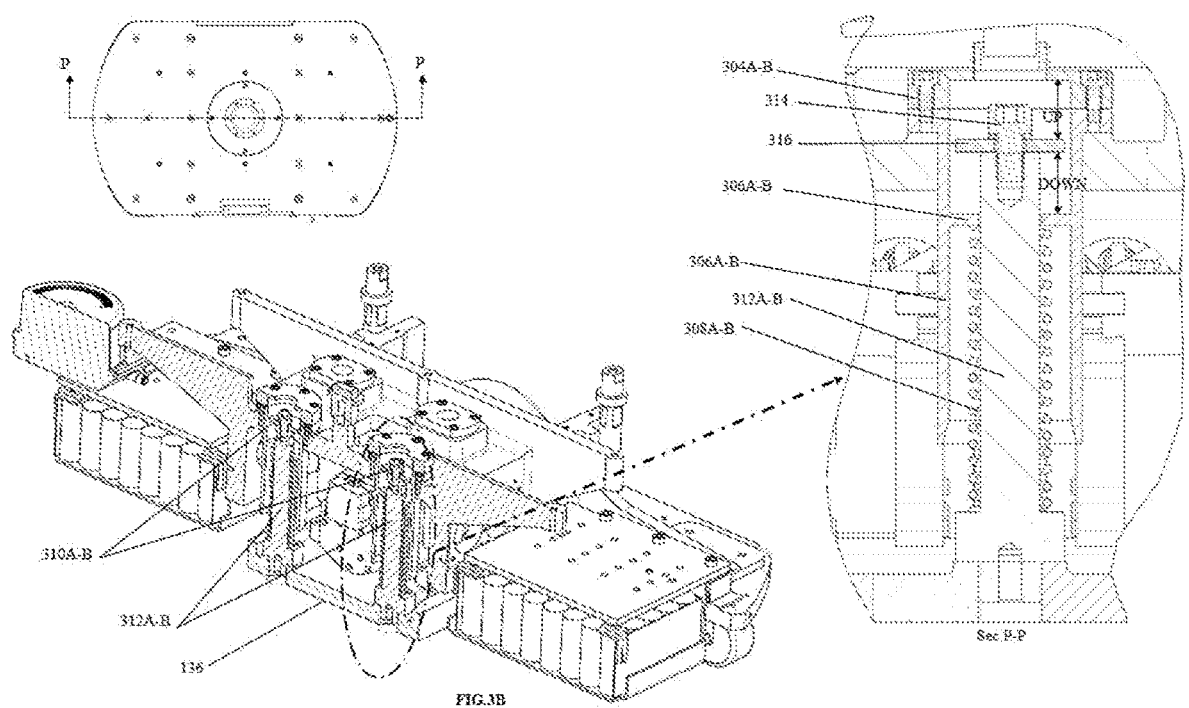

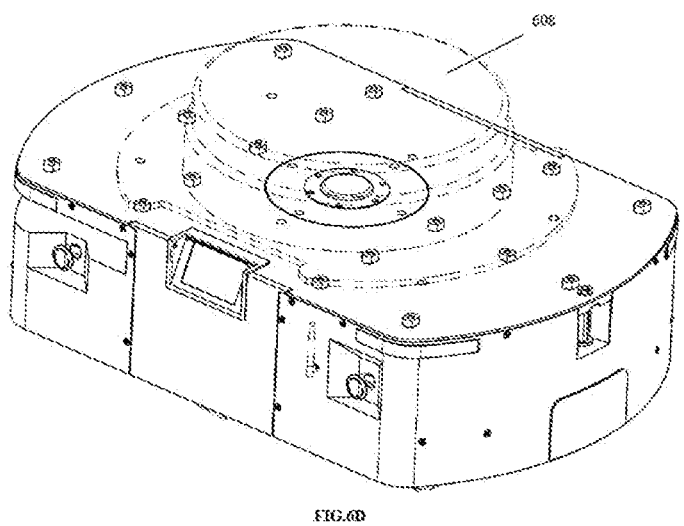

AUTONOMOUS MOBILE ROBOT WITH A SINGLE MODULAR PLATFORM

PRIORITY CLAIM

The present application is a U.S. National Stage Filing under 35 U.S.C. § 371 and claims priority from International Application No. PCT/IB2020/056961, filed on Jul. 23, 2020, which application claims priority from Indian Patent Application No. 201921031019, filed on Jul. 31, 2019. The entire contents of the aforementioned applications are incorporated herein by reference.

TECHNICAL FIELD

The disclosure herein generally relates to robotics system, and, more particularly, to an autonomous mobile robot with a single modular platform.

BACKGROUND

The unrelenting need for increased productivity during a short span of time and delivery of end products with uniform quantity and unwavering quality, has lead industries towards automation. A third industrial revolution introduced automation which tremendously increased mass production in short time span. Industry 4.0 is now leading this change by transforming traditional warehouses into smart factories. In present scenario, a major share of the total cost is spent for order picking in a warehouse or distribution center. Traditionally, the order pickers collect the order manually from each of location in the warehouse and queuing for packing and shipping. As an alternative approach, the order picking was automatically processed for packing and shipping instead of workers manually going to the warehouse. This trend has increased requirement of automated vehicles. Utilization of autonomous navigation-based vehicles enables to achieve flexibility without need to modify existing infrastructure. There are multitude of applications for these automated vehicles, few to mention include lifting or tugging. Further robots can also be transported or mounted on the automated vehicles for pick and transport application.

The need of increasing productivity, reliability, safe handling by introduction autonomous mobile robots where jobs are monotonous with operators continuously handling heavy loads for pick and place. The effectiveness of the robots can be enhanced by introduction of a mobile platform enabling to perform applications like picking, cutting operations, assembly, machine tending, and list goes on. Using the robots for certain operations for improved economic efficiency has been in practice for some time now. By introducing mobility, robots are enabled to do a set of jobs at one place and move to another place and do remaining tasks just like a human being. This also improves utilization by enabling for 24×7 operations. In a mobile manipulation system, transportability is offered by the mobile platform and expertise is offered by the manipulator.

Most autonomous mobile robots (AMRs) in market and their approach is to design altogether a separate unit for each applications. Each design is specific to each application. Functionality & sub functions of AMRs are specific to each function. The challenges in mobile platform are numerous, with a main challenge being space constraint. Providing flexibility to employ all the functionalities, the mobile platform on which the robots are mounted should not take much space to encapsulate required installations. The space constraints which include narrow aisles with small turning radii for maneuvering turns, safety spaces with humans working in the vicinity, small workspaces, all these tend to make the mobile platform smaller and smaller. Other technological challenges in bringing modularity. For example, if the AMR has to have Lift and Carry unit, it should have light self-weight to be able to carry more load and at same contradicting requirement if needed to mount the robot on top of this AMR and then AMR has to be very heavy to be stable and not topple.

SUMMARY

Embodiments of the present disclosure present technological improvements as solutions to one or more of the above-mentioned technical problems recognized by the inventors in conventional systems. For example, in one embodiment, an autonomous mobile robot (AMR) with a single modular platform to mount plurality of material handling units is provided. The autonomous mobile robot (AMR) includes a monolithic chassis; a top plate includes a plurality of standoffs to mount at least one material handling units; the plurality of standoffs are integrated on top of the top plate; drive wheels are coupled to a wheel mount as a single unit to form a drive wheel assembly; a suspension unit is coupled symmetrically in between two main bodies which corresponds to the monolithic chassis and the drive wheel assembly with spring enclosures, suspension shafts and coil springs; and a set of side plates connect the monolithic chassis on either sides of the AMR.

The top plate is sandwiched between the plurality of standoffs and the monolithic chassis. A load is transferred from the plurality of material handling units through the plurality of standoffs and the top plate to the monolithic chassis. The suspension shafts are connected to the wheel mount. The wheel mount is rigidly connected to the drive wheels and the spring enclosure are rigidly connected to the monolithic chassis. The suspension unit with plurality of linear bearings and a bearing shaft allows the drive wheels to move up and down together as one unit in a vertical direction so that the drive wheels touch ground to produce a driving torque.

In an embodiment, the plurality of standoffs may further correspond to a plurality of short length standoffs and a plurality of long standoffs. In an embodiment, a monolithic casting of the monolithic chassis may act as a base frame of the AMR with four swivel wheels coupled directly and the drive wheels coupled indirectly with the wheel mount. In an embodiment, the monolithic chassis may be symmetric about X-X and Y-Y axis including plurality of ribs to hold the top plate. In an embodiment, a plurality of ribs may be configured to strengthen the four corners of the monolithic chassis. In an embodiment, the four swivel wheels may be coupled to the monolithic chassis.

In an embodiment, the plurality of linear bearings and the suspension unit may be connected to the monolithic chassis which is further coupled with the drive wheels through the wheel mount. In an embodiment, the drive wheels may be placed at a centre of the AMR to control at least one mechanism of the AMR includes: (i) a forward, (ii) a reverse, (iii) a turning, (iv) a swivelling, and (v) braking. In an embodiment, the monolithic chassis may be rigid. In an embodiment, rigidity may be provided by connecting the set of side plates and connecting plates at a front side and a rear side. In an embodiment, the monolithic chassis may consist of plurality of circular openings (holes) for at least one cooling fan to provide cooling for at least electric components and drive motors. In an embodiment, the plurality of long standoffs may be coupled between the top plate and the monolithic chassis to provide more load transfer area for the top plate. In an embodiment, the plurality of long standoffs (106A-N) may act as locating points for the top plate.

In an embodiment, the top plate may include a plurality of mounting holes for at least one standoff. In an embodiment, the top plate may be coupled with the monolithic chassis by plurality of fasteners and located by the plurality of long standoffs. In an embodiment, counterweight may be added at bottom of the AMR based on at least one of: (i) a payload requirement, (ii) position of the material handling units, (iii) plurality of applications, and combination thereof. In an embodiment, plurality of shafts may be mounted on the wheel mount with the plurality of fasteners from a bottom side, and at other end plurality of centre shafts receive the coil springs and embossed in the spring enclosure. In an embodiment, remaining plurality of shafts may be freely sliding in the plurality of linear bearings if suspension is actuated.

In an embodiment, the coil springs may be placed in between two rigid links. In an embodiment, the two rigid links may refer to the suspension shaft and the spring enclosures, which creates a damping action of the AMR. In an embodiment, at least one of a robot or a cobot may be placed on the modular platform of the AMR to pick and place at least one object from one location to another location. In an embodiment, a tugger pin may be mounted on the top plate of the monolithic chassis to attach at least one cart.

In an embodiment, an automatic tugging unit (hook) may be mounted through the plurality of standoffs on the top plate to automatically attach at least one cart. In an embodiment, a Lift and Indexing table unit may be mounted through the plurality of standoffs of the AMR to transfer plurality of racks from one location to another location. In an embodiment, a transfer conveyor may be mounted through the plurality of standoffs of the AMR to deliver plurality of objects from one location to another location. In an embodiment, an object identification unit may be mounted through the plurality of standoffs of the AMR to scan the plurality of objects.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2B illustrates a plurality of standoffs of the AMR according to embodiments of present disclosure.

FIG. 3A-3D illustrates a suspension unit of the AMR according to embodiments of present disclosure.

FIG. 6D is an exemplary view illustrating a Lift and Indexing table unit mounted on the modular platform of the AMR by using short length standoffs according to embodiments of the present disclosure.

DETAILED DESCRIPTION OF EMBODIMENTS

Figure 1A:
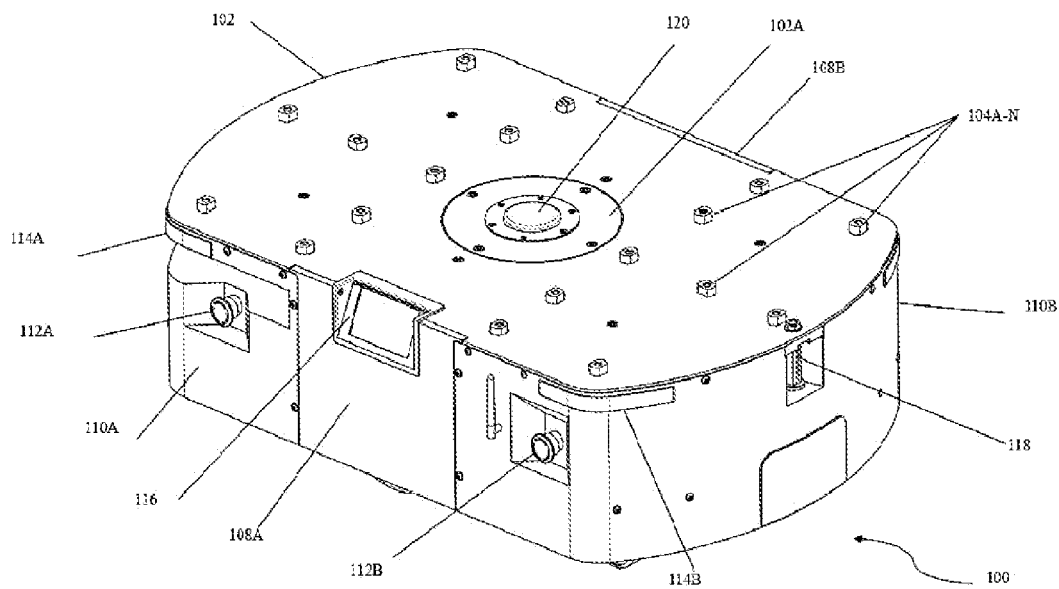
FIG. 1A-1D illustrates an autonomous mobile robot (AMR) with a single modular platform to perform plurality of tasks according to embodiments of the present disclosure.
Figure 1B:
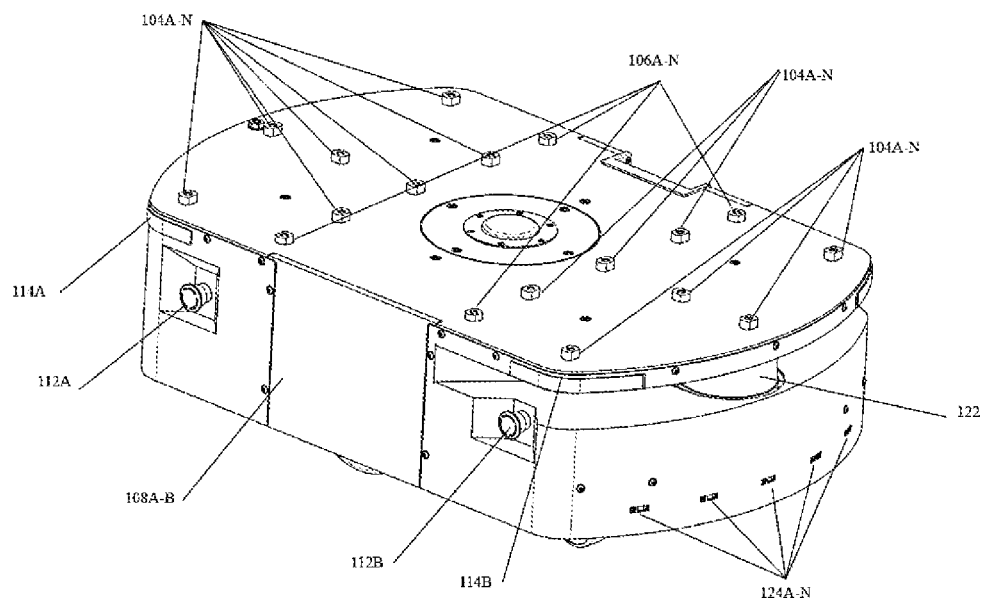
Figure 1C:
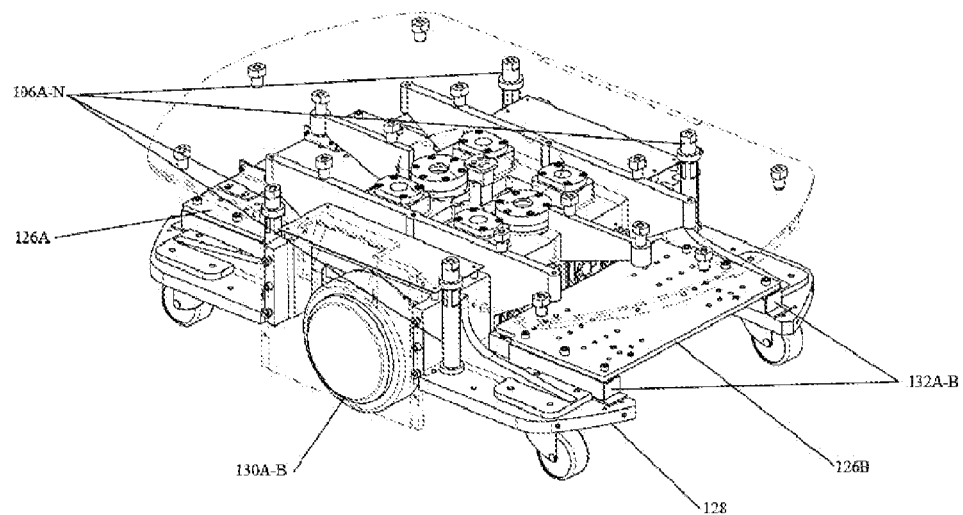
Figure 1D:
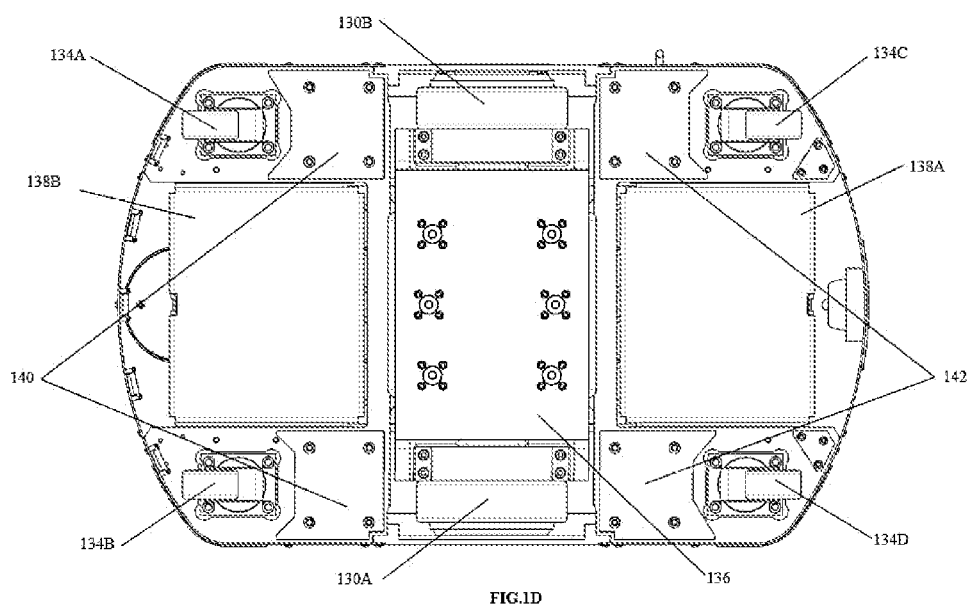

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments of the present disclosure provide a mobile platform, alternatively referred as an autonomous mobile robot (AMR), which is designed to be modular and compact in order to perform plurality of tasks in varied workspace environments. The AMR comprises a base platform vehicle, designed to be modular and compact to mount plurality of material handling units for plurality of applications. The applications include but are not limited to (a) mount a pick and place robot/cobot at standard human height for various sub-functionalities, (b) mount an automatic tugging unit to tug a train of transportable carts for material transport along with above, (c) mount the same pick and place robot/cobot at a higher position where higher reach is required, (d) lift and carry empty or loaded racks of specific sizes, and (e) manually tug along a series of carts.

Referring now to the drawings, and more particularly to FIG. 1 through 6F, where similar reference characters denote corresponding features consistently throughout the figures, there are shown preferred embodiments and these embodiments are described in the context of the following exemplary system and/or method.

Reference numerals of one or more components of an autonomous mobile robot (AMR) as depicted in the FIGS. 1 through 6F are provided below for ease of description:

| S. NO | NAME OF COMPONENT | REFERENCE NUMERALS |
|---|---|---|
| 1 | Autonomous Mobile Robot (AMR) | 100 |
| 2 | Top plate | 102 |
| 3 | Top plate cover | 102A |
| 4 | Short length standoffs | 104A-N |
| 5 | Long standoffs | 106A-N |
| 6 | set of side plates | 108A-B |
| 7 | a front and a rear cover | 110A-B |
| 8 | an emergency switch | 112A-B |
| 9 | LED covers | 114A-B |
| 10 | Display unit | 116 |
| 11 | a tugger pin | 118 |
| 12 | Interface cover | 120 |
| 13 | LIDAR sensor | 122 |
| 14 | IR sensors | 124A-N |
| 15 | Connecting plates | 126A-B |
| 16 | Chassis | 128 |
| 17 | Drive wheels | 130A-B |
| 18 | Battery sliding block | 132A-B |
| 19 | Swivel wheel | 134A-D |
| 20 | Wheel mount | 136 |
| 21 | Battery sub-assembly | 138A-B |
| 22 | Front side counterweights | 140 |
| 23 | Rear side Counterweights | 142 |
| 24 | Drive wheel assembly | 144 |
| 25 | Bores in which the linear bearings are fixed | 202A-D |
| 26 | Bores in which the spring enclosure is fixed | 204A-B |
| 27 | Cutouts for the up/down movement of drive motors | 206A-B |
| 28 | Pin holes for mounting the side plates | 208A-B |
| 29 | Holes for fan air circulation | 210A-N |
| 30 | Ribs to strengthen the chassis | 212A-D |
| 31 | Ribs for mounting the top plate | 214A-N |
| 32 | Surface for fixing the battery sliding block | 216 |
| 33 | Holes for swivel wheel mounting | 218A-D |
| 34 | Standoffs used for mounting Robot/cobot option | 220A-C |
| 35 | Standoffs used for mounting Automated tugger unit | 222A-B |
| 36 | Standoffs used for mounting Lift and indexing unit, object identification unit & conveyor bed unit | 224 |
| 37 | Battery | 226 |
| 38 | Pins used to mount the side plates at both the sides | 228A-B |
| 39 | Linear bearings | 302A-D |
| 40 | Shaft stopper | 304A-B |
| 41 | Spring enclosures | 306A-B |
| 42 | Coil Springs | 308A-B |
| 43 | Washer | 310A-B |
| 44 | Suspension shaft | 312A-B |
| 45 | Hexagonal nut | 314 |
| 46 | Suspension stroke restrictor | 316 |
| 47 | Bearing shaft | 318 |
| 48 | Cobot mounting option | 602 |
| 49 | Manual tugging | 604 |
| 50 | Automatic tugging unit | 606 |
| 51 | a Lift and Indexing table unit | 608 |
| 52 | a conveyor bed | 610 |
| 53 | an object identification unit | 612 |

FIG. 1A-1D illustrates an autonomous mobile robot (AMR) 100 with a single modular platform to perform plurality of tasks according to embodiments of the present disclosure. In an embodiment, the mobile platform corresponds to the autonomous mobile robot (AMR) 100 which is designed to be modular and compact in order to perform plurality of tasks in one or more workspace environment. In an embodiment, the plurality of tasks or plurality of functionalities corresponds to at least one of application but are not limited to (a) mount a pick and place robot/cobot at standard human height for various sub-functionalities, (b) mount an automatic tugging unit to tug a train of transportable carts for material transport along with above, (c) mount the same pick and place robot/cobot at a higher position where higher reach is required, (d) lift and carry empty or loaded racks of specific sizes, and (e) to manually tug along a series of carts.

The autonomous mobile robot (AMR) includes one or more components such as a top plate 102, a top plate cover 102A, a plurality of standoffs which further includes plurality of short length stand offs (104A-N) and plurality of long stand offs (106A-N), a set of side plates 108A-B, a suspension unit, a battery housing unit, a front and rear cover 110A-B, a tugger pin 118, an interface cover 120, a chassis 128, and a drive wheel assembly 144 (Shown in FIG. 3A-3D). The autonomous mobile robot 100 is composed of plurality of sensors to form navigation and automatic guidance system. The chassis 128 can be a monolithic chassis (e.g., chassis made as a single casted metal from a mold). In one embodiment, the chassis 128 can be machined out of a single block of metal. In another embodiment, the chassis 128 can be a weld-ment assembly (e.g., a set of part configured to be as single part by a welding process). In yet another embodiment, the chassis 128 can be of a 3D printed metal. In an embodiment, the chassis 128 acts as a master part of the AMR 100 on which one or more parts are mounted. In an embodiment, the modular platform of the AMR 100 includes provision for one or more mounting and tugging options.

The chassis 128 is supported with four swivel wheels 134A-D and two motorized drive wheels 130A-B. The drive wheels 130A-B with a wheel mount 136 forming the drive wheel assembly 144 is isolated from the chassis 128 by means of the suspension unit. In an embodiment, the interface cover 120 is configured to mount any communication ports or connecting paths for one or more base unit (e.g., the AMR 100) to plurality of handling units (e.g. tugger unit, cobot mounting unit, a lift and index table unit as shown FIG. 6A-6F).

The AMR 100 includes the suspension unit in between the drive wheel assembly 144 and the chassis 128 which helps the AMR 100 to move on the ground providing damping for the platform. The AMR 100 is capable to operate on own program of automatic navigation system (e.g., SLAM—Simultaneous localization and Mapping) through various obstacles. The top plate 102 is resting on the chassis 128 and supported/located by the long stand offs 106A-N. The four swivel wheels 134A-D are connected at four corners of the chassis 128 allowing the AMR 100 to move freely on ground. The AMR 100 include the pair of motorized drive wheels 130A-B mounted on the wheel mount 136 is coupled underneath the chassis 128 forming two-wheel drive (with additional four follower wheels which are the 360 degree swivel wheels). The suspension unit is sandwiched in between the chassis 128 and the drive wheel housing.

In an embodiment, the AMR 100 may include one or more processors, communication interface device(s) or input/output (I/O) interface(s), and one or more data storage devices or memory operatively coupled to the one or more processors. The memory comprises a database. The one or more processors that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the AMR 100 can interact with variety of computing systems, such as laptop computers, notebooks, hand-held devices, workstations, mainframe computers, servers, a network cloud and the like.

The I/O interface device(s) can include a variety of software and hardware interfaces, for example, a web interface, a graphical user interface, LCD displays and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory may include any computer-readable medium known in the art including, for example, volatile memory, such as static random access memory (SRAM) and dynamic random access memory (DRAM), and/or nonvolatile memory, such as read only memory (ROM), erasable programmable ROM, flash memories, hard disks, optical disks, and magnetic tapes.

The database may store information such as but are not limited to, a plurality of parameters obtained from one or more sensors, whereas the plurality of parameters are specific to e.g., a user, a machine, a plurality of components and the like. In an embodiment, the one or more sensors may be a LIDAR sensor 122, IR sensors 124A-N, an IMU sensor, a load cell, a vision sensor and the like. The parameters may include sensor data captured through the sensors either connected to the user and/or to the machine. Further, the database stores information pertaining to inputs fed to the AMR 100 and/or outputs generated by the AMR 100 (e.g., data/output generated at each stage of the data processing), specific to the methodology described herein. More specifically, the database stores information being processed at each step of the proposed methodology.

Figure 2A:
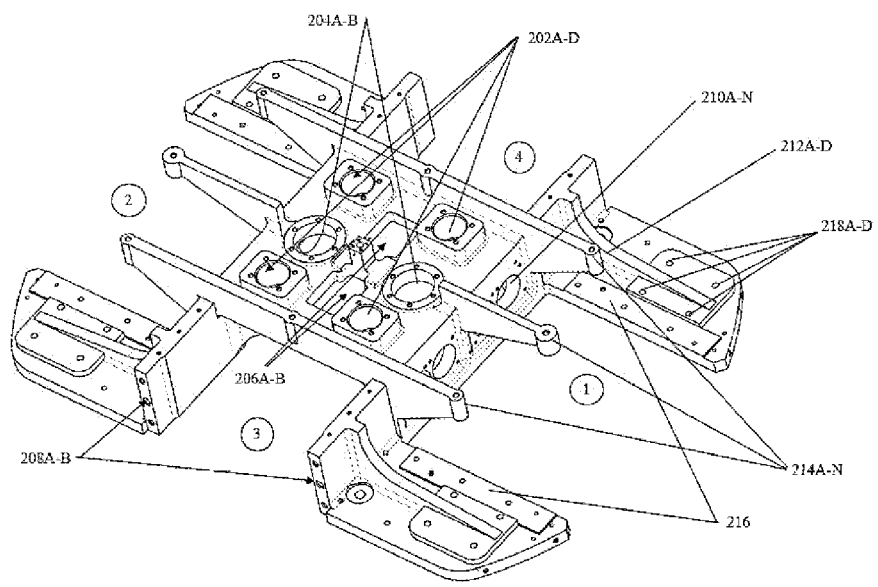
FIG. 2A illustrates a monolithic chassis of the AMR according to embodiments of present disclosure.
Figure 2C:
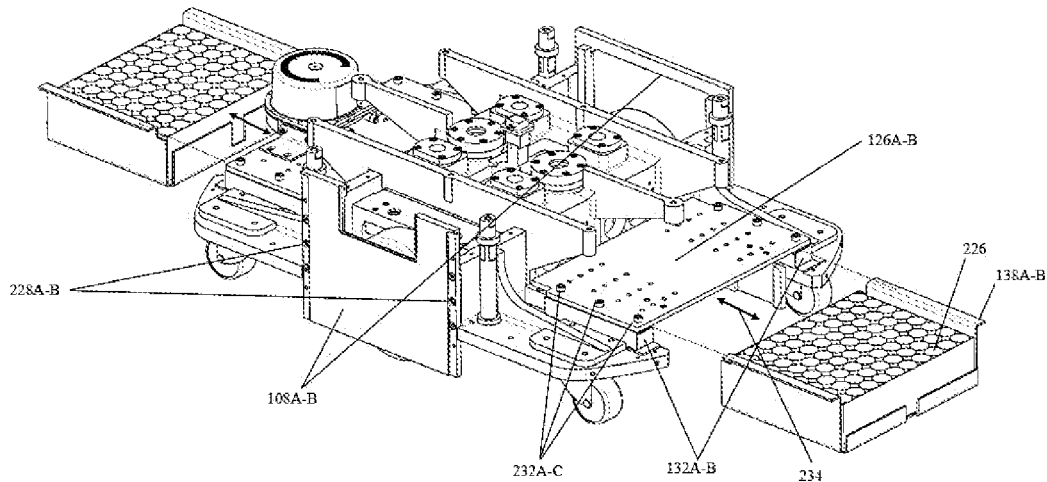
FIG. 2C illustrates a battery housing unit of the AMR according to embodiments of present disclosure.

With reference to 1A-1D, FIG. 2A illustrates the monolithic chassis 128 of the autonomous mobile robot 100 according to embodiments of present disclosure. In an embodiment, the chassis 128 corresponds to the monolithic chassis. The monolithic chassis 128 is designed to be symmetrical among both XX & YY central planes which are vertical and passing through centre of the AMR 100. In an embodiment, the monolithic chassis (128) is symmetric about X-X and Y-Y axis comprising plurality of ribs to hold the top plate (102) and the four swivel wheels (134A-D) are coupled at four corners.

The chassis 128 comparatively being heaviest part of the AMR 100 brings in stability to the AMR 100 under one or more applications conditions. The chassis 128 also houses one or more heavier components such as a battery 226, the top plate 102, plurality of standoffs, plurality of sensors and other electrical and electronics parts. In an embodiment, the chassis 128 rests on the four swivel wheels 134A-D. The swivel wheels 134A-D provides support to the top plate 102 and associated components on top which also are very heavy. The chassis 128 also houses other end of elements of a suspension system i.e. the drive wheel assembly 144. The chassis 128 further include a provision to accommodate counterweights at bottom, counterweights can be added to balance the AMR 100 depending on one or more applications. The chassis 128 of the AMR 100 also made with plurality of circular cutouts at each side (widthwise) for air circulations provided extra mounting holes 210A-N around cutout to mount one or more cooling fans. In an embodiment, the one or more cooling fans are used to cool electrical components and the drive wheels 130A-B.

The cooling fan is configured to remove heat generated by electrical components in the AMR 100. In an embodiment, there are a plurality of ribs 214A-N (e.g., six ribs and equal number at each side) provided from top of the chassis 128 and supports the top plate 102. A plurality of ribs 212A-D strengthen the chassis 128 by providing rigidity. There are four bores 202A-D placed equally from centre (widthwise) of the chassis 128 in which one or more linear bearings 302A-D (Shown in FIG. 3) are fixed. Further, there are two more bores 204A-B placed equally from the centre (lengthwise) of the chassis 128 in which one or more spring enclosures 306A-B with a suspension shaft stopper 304A-B are fixed. In an embodiment, additionally there are four more ribs provided at the four corners of the chassis 128 to provide strength. There are two cutouts made on top of the chassis 128 (offset from centre line of the chassis 128). In an embodiment, drive motors are moved up and down through a cutout 206A-B without hitting the side walls. In an embodiment, each corner includes a machined surface 216 for fixing a battery sliding block 132A-B. In an embodiment, there are pin holes 208A-B provided to fix the side plates on to the chassis 128.

With reference to 1A-1D, the autonomous mobile robot (AMR) 100 includes the top plate 102 which holds different short length standoffs on which the different material handling units like robot/cobot mounting unit, lift and indexing table unit to carry racks, tugger unit etc., get mounted on. In an embodiment, load from the different material handling units acts on the standoff then the load is configured to transfer to the top plate 102 to the chassis 128. In an embodiment, the top plate 102 is mounted on the chassis 128 and located by long standoffs 106A-N whereas these stand offs also help to transfer the load directly from the top plate 102 to the chassis 128.

With reference to 1A-1D, FIG. 2B illustrates utilization of plurality of standoffs of the autonomous mobile robot (AMR) 100 according to embodiments of present disclosure. The AMR 100 shown in FIG. 2B which highlights standoffs used for mounting Robot/cobot option 220A-C, standoffs used for mounting Automated tugger unit 222A-B, standoffs used for mounting Lift and indexing unit, an object identification unit & conveyor bed unit 224. The plurality of standoffs are integrated on top of the top plate 102. The top plate is sandwiched between the plurality of standoffs and the monolithic chassis (128). In an embodiment, a load is transferred from the plurality of material handling units through the plurality of standoffs and the top plate (102) to the monolithic chassis (128), such a way that the top plate 102 deflection is minimal. In an embodiment, the plurality of stand offs are placed in such a way that the load distribution due to additional options is transferred uniformly on to the chassis 128. The top plate 102 also includes a circular opening at the center and covered by a small cover to protect the IMU sensor unit and also to mount or connect one or more interfacing connectors to the one or more material handling units.

With reference to FIG. 1A-1D, the autonomous mobile robot (AMR) 100 includes the drive wheel assembly 144 according to embodiments of present disclosure. The wheel mount 136 with the two drive wheels 130A-B in center of the AMR 100 and six shafts coupled at the one end of the wheel mount 136 which forms the drive wheel assembly 144. The shafts are mounted on the wheel mount 136 with hexagonal bolts from the bottom side, and at the other end two center shafts receives the coil springs 308A-B and embossed in spring enclosure 306A-B, whereas remaining four shafts freely slide in the linear bearings 302A-D as the suspension unit starts actuating.

With reference to FIG. 1A-1D, the autonomous mobile robot (AMR) includes the suspension unit according to embodiments of present disclosure. The suspension unit consists of the four linear bearings 302A-D and two coil springs 308A-B with the spring enclosures 306A-B and the shaft stopper 304A-B. Both the linear bearings 302A-D and spring with enclosure is supported by six shafts from the wheel mount 136. In an embodiment, arrangement is made symmetrical. A suspension sub assembly makes the entire drive wheel assembly 144 to move up and down in a vertical direction to ensure that the drive wheels 130A-B always be touching ground while traversing through small inclinations, bumps, ramps etc.

With reference to FIG. 1A-1D, FIG. 2C illustrates the battery housing unit of the autonomous mobile robot (AMR) 100 according to embodiments of present disclosure. The battery housing unit consists of two battery sliding blocks 132A-B, two connecting plates 126A-B and two batteries with battery holding tray. The two battery sliding blocks 132A-B are fastened on the chassis 128. The two blocks are further connected by the two connecting plates 126A-B and configure the chassis 128 rigid by connecting itself in between the two left out regions of chassis cutouts. In an embodiment, the monolithic chassis (128) is rigid by connecting the two side plates and connecting plates (126A-B) at front and rear side. In an embodiment, between battery sliding blocks 132A-B and the connecting plates 126A-B, there provided a small space in which a battery tray with the battery can slide forward and backward by just unthreading one or more hex bolts 314 used to connect the plates. The connecting plates 126A-B is provided with holes for mounting the electric and electronic components.

With reference to FIG. 1A-1D, the autonomous mobile robot (AMR) 100 includes the set of side plates 108A-B according to embodiments of present disclosure. The set of side plates 108A-B connects the chassis 128 on either sides to strengthen the chassis 128. A plurality of pins 228A-B on the set of side plates 108A-B to the chassis 128 takes the load and prevents from deflection of the chassis 128. In an embodiment, the set of side plates 108A-B improves aesthetics and holds a sheet metal outer cover as well. In an embodiment, one of the set of side plate 108A-B holds a case for a display unit 116 (a HMI display). The autonomous mobile robot (AMR) 100 further includes the tugger pin 118 according to embodiments of present disclosure. The top plate 102 includes a hole at the rear end where the tugger pin 118 sits in. The tugger pin 118 is fixed using the hex nut 314 from the top of the top plate 102 and helps in manual tugging. In an embodiment, the tugger pin 118 is made up of high strength steel to take the load so that should not fail during the operation.

The autonomous mobile robot (AMR) 100 further includes the front and rear cover 110A-B according to embodiments of present disclosure. The AMR 100 includes two sheet metal curved covers one is placed at the front side and another one is placed at rear side of the AMR 100. The two covers are connected between the top plate 102 and to the chassis 128 at the bottom. The front cover 110A comprises enough opening space for the LIDAR sensor 122 to sense the presence of obstacle in front of the AMR 100. The cover also includes the cutouts for IR/ultrasonic sensor 124A-N placed at bottom. The rear cover 110B includes a special cutout for the tugger pin 118 and charging port of the AMR 100. In an embodiment, there is cut out for emergency switch 112A-B and LED covers 114A-N in the both the covers. The covers contribute in aesthetic look of the AMR 100 covering all internal structure. The autonomous mobile robot (AMR) 100 further includes the top plate cover 102A that is screwed on the main top plate, which can be easily removed to access the wiring from an AMR base to the material handling units.

Figure 2D:
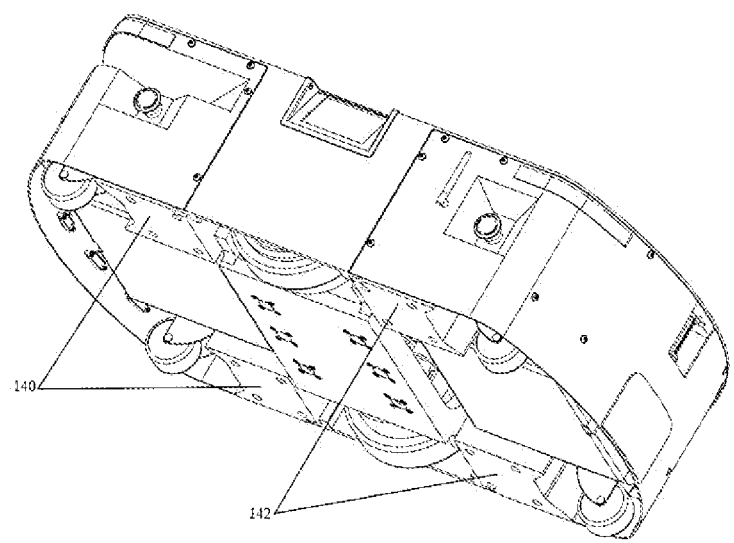
FIG. 2D illustrates a positioning of counterweights in the AMR according to embodiments of the present disclosure.
Figure 3A:
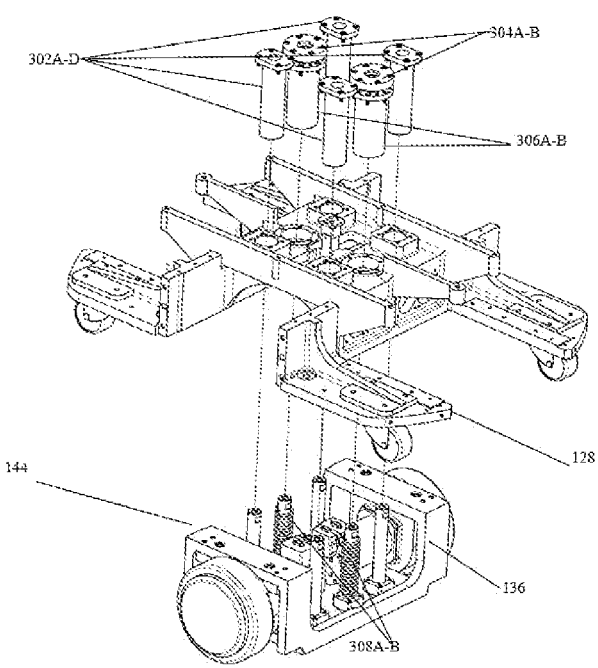
Figure 3C:
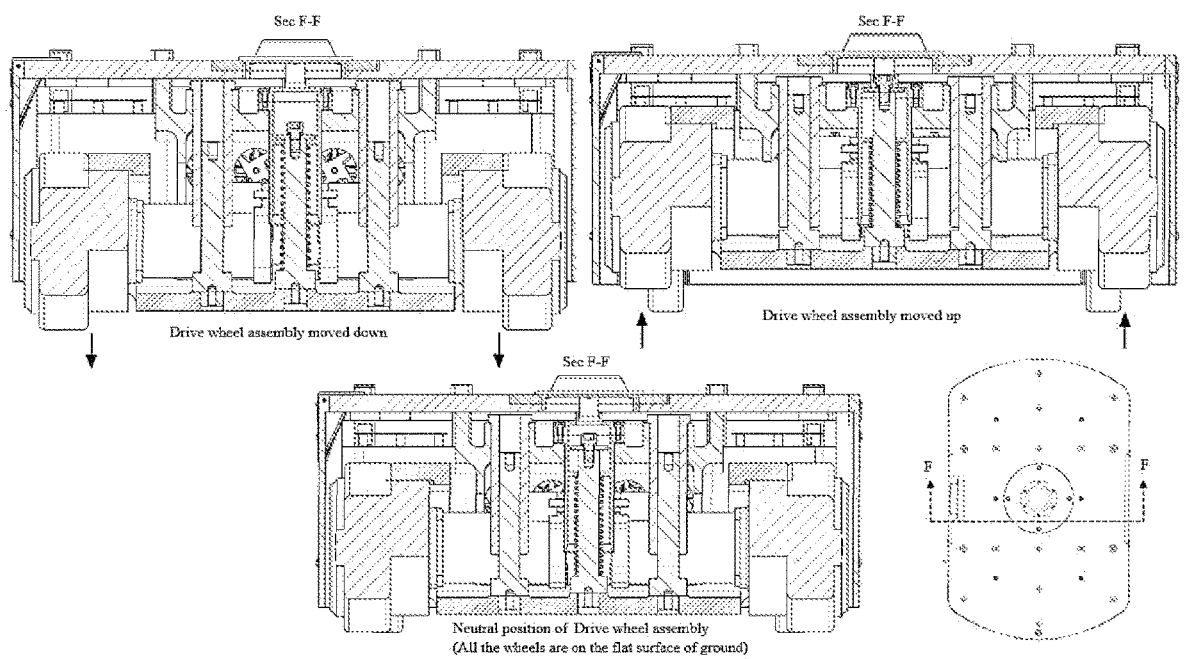
Figure 3D:
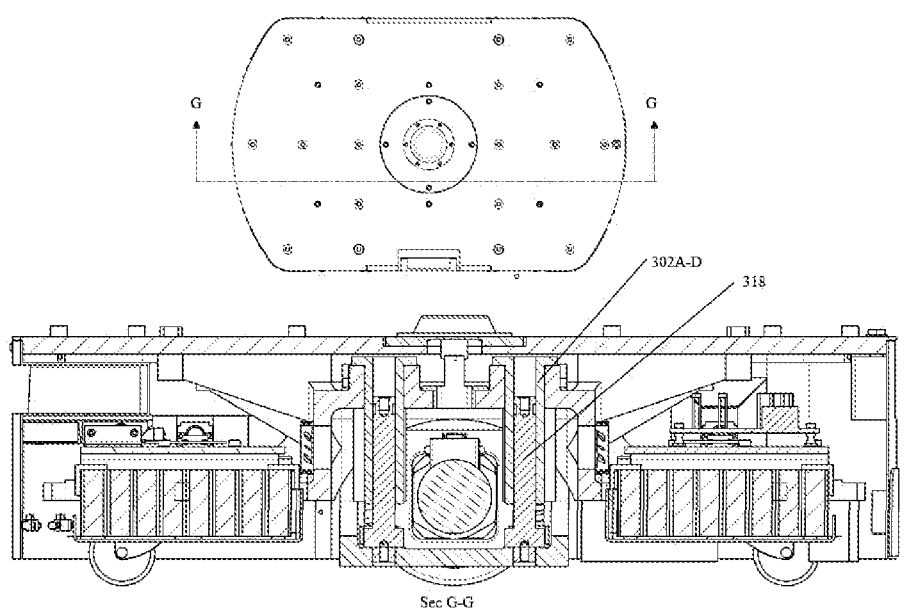
Figures 4A, 4B:
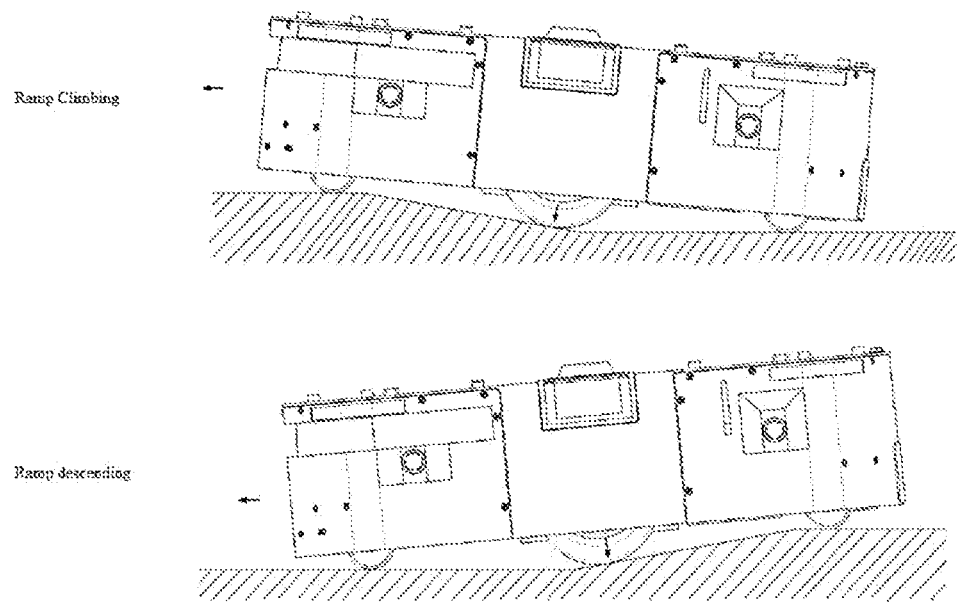
FIG. 4A-4B illustrates an exemplary view of a ramp climbing and a ramp descending of the suspension unit of the AMR according to embodiments of present disclosure.
Figure 5:
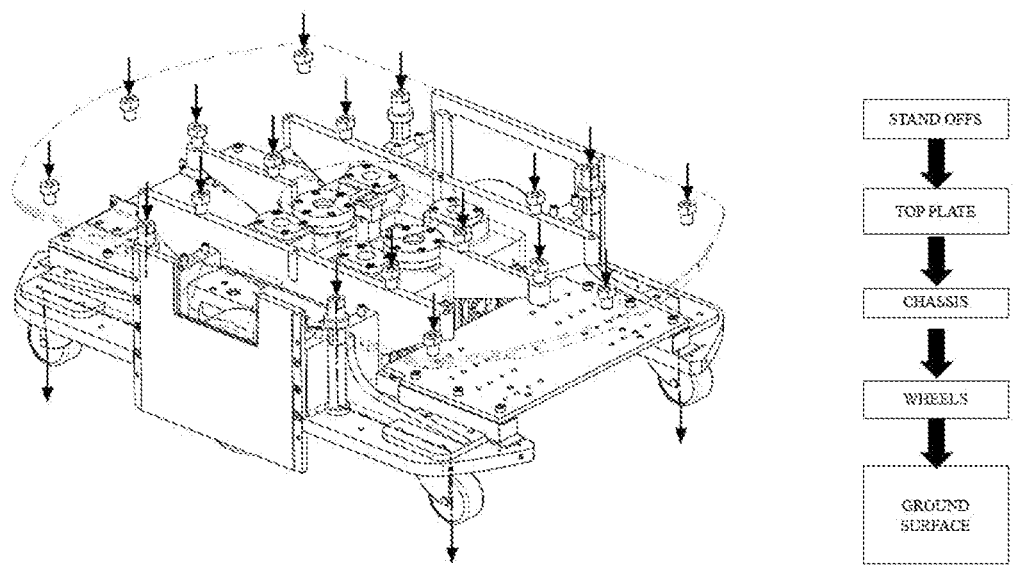
FIG. 5 illustrates a load transfer in the AMR according to embodiments of present disclosure.

FIG. 2D illustrates a positioning of counterweights in the autonomous mobile robot (AMR) 100 according to embodiments of the present disclosure. The AMR 100 in which the chassis 128 includes four positions intentionally made for counterweights placements or counterweights mounting arrangement in order to counterbalance the AMR 100. In an embodiment, adding the counterweights at the bottom of the AMR 100 purely depends on application and position of the material handling unit. In an embodiment, four different counterbalance weight position can be used independently or collectively for different material handling apparatus as per requirements. In an embodiment, design is made adaptable for other robots with higher payloads by adding counterweights.

In another embodiment, the counter weights needs to be added based on at least one of following conditions: (i) If the robot/cobot is mounting on the front side of the AMR 100 then the counter weight needs to be added at the rear side of the AMR 100, (ii) During manual tugging of the train of the carts, counter weight needs to be added at the front side of the AMR 100, (iii) For automated tugging unit the counter weights needs to be added at the front side of the AMR 100, (iv) For lift and indexing table unit the counter weights may/may not be added at the either side of the AMR 100 depending on the application load characteristics, since the lift and indexing table unit is mounted at the center of the AMR 100, and (v) For robot/cobot mounting unit the counter weight needs to be added at the rear side of the AMR 100. For example, a table 1 which refers to adding of the counterweight to balance the AMR 100:

TABLE 1

| S. No | Material Handling units | Position of material handling units (On TOP of Base vehicle) | Counter weight | Position of counterweights (At Bottom of Base vehicle) | Payload |
|---|---|---|---|---|---|
| 1 | Cobot mounting | Front side of the AMR | Required | Rear side of the AMR | Yes |
|  |  | Center of the AMR | Required | Both Front & rear side of the AMR | Yes |
|  |  | Rear side of the AMR | Required | Front side of the AMR | Yes |
| 2 | Tugging (Automatic or Manual) | N.A | Required | Front side of the AMR | Yes |
| 3 | Lift and Indexing | Center of the AMR | Not required | N.A | Yes |
| 4 | Transfer conveyor | Center of the AMR | Required | Both Front & rear side of the AMR | Yes |

With reference to FIG. 1A-1D, FIG. 3A-3D illustrates a suspension unit of the autonomous mobile robot (AMR) 100 according to embodiments of present disclosure. The suspension unit forms a mono-suspension unit for the drive wheels 130A-B. In an embodiment, the mono-suspension unit isolates the chassis 128 from the drive wheel assembly 144. The wheel mount 136 with the two drive wheels 130A-B in center of the vehicle and six shafts coupled at the one end of wheel mount forms the drive wheel assembly 144. The suspension unit includes two spring enclosures 306A-B, two suspension shafts 312A-B, two suspension stroke restrictor 316 and two coil springs 308A-B. The shafts are connected to the wheel mount 136 (e.g., whereas the wheel mount 136 is rigidly connected to the drive wheels 130A-B forming the drive wheel assembly 144) and the spring enclosure 306A-B is rigidly connected to the chassis 128.

The coils springs 308A-B is placed and compressed in between the spring enclosure 306A-B from the chassis 128 and the shafts from the wheel mount 136. Since the coil springs 308A-B is now placed in between two rigid links (i.e. the suspension shaft 312A-B and the spring enclosure 306A-B) and in compressed condition creates damping action of the AMR's platform while moving on uneven surface of the ground. A spring behavior is such that, can push the drive wheels 130A-B towards the ground (always ensuring the positive contact between the ground and the drive wheel) and also provides sufficient force to maintain required driving torque while moving on horizontal as well as when there is upward or downward slope (ramp). In an embodiment, at the same time, features which also holds the chassis 128 with a top unit of the AMR 100 and ensures that should not come out from the suspension system due to spring force.

The suspension unit is supported by the four linear bearings 302A-D mounted on the base frame allowing the sliding contact for four another shafts (placed axially with the bearing axis) from the wheel mount 136. The AMR 100 includes parallel suspension through which both the drive wheels move up and down simultaneously whereas width from end of drive wheel to drive wheel is very compact & the values are not changed. In an embodiment, the configuration makes the AMR 100 very compact for working in narrow aisles, and for the same vehicle with individual pivoted suspension, the system cannot be made as compact. In an embodiment, individual pivoted mechanism makes arc movement of wheels which cause more width of vehicle. In an embodiment, there are three position in the current suspension system actuates. In an embodiment, during neutral position of the AMR 100 all the swivel wheels 134A-D and the drive wheels 130A-B are continuously in contact with the ground surface. In an embodiment, there are no suspension effect until the wheels experiences any of the irregularities on the floor such as ramps. The coil springs 308A-B is in intermediate compressed condition during a neutral position.

With reference to FIG. 1A-1D, FIG. 4A-4B illustrates an exemplary view of a ramp climbing and a ramp descending respectively of the suspension system of the autonomous mobile robot (AMR) 100, according to embodiments of present disclosure. For example, the ramp climbing, when the drive wheels 130A-B experience the ramp to climb, initially the pair of front swivel wheels roll on the ramp and rear swivel wheels are on the flat surface of the ground. As the AMR 100 starts climbing—initially the drive wheel assembly 144 tries to move down and the coil springs 308A-B expands which forces the drive wheels 130A-B to move down against the ground. During the downward movement suspension stroke restrictor 316 (down surface) moves down to 25 mm from the neutral position and further it hits the spring enclosures 306A-B inner step, later the drive wheel assembly 144 gets back to a neutral position (drive wheels moves up) uniformly as the pair of rear swivel wheels will roll on the ramp. A washer 310A-B is placed on the top of suspension shaft 312A-B with the help of hexagonal bolt and spring washer, whereas the suspension shaft 312A-B is rigidly mounted on the wheel mount 136 with help of four hexagonal bolts.

Similarly, for example, the suspension system in which the ramp descending, when the AMR 100 experience the ramp to descend, initially the pair of front swivel wheels roll on the ramp and rear swivel wheels are on the flat surface of the ground whereas the drive wheel assembly 144 tries to move up on the ramp. Further as the AMR 100 starts descending the drive wheel unit initially tries to move upward compressing the coil springs 308A-B opposite to the ground. As the drive wheel unit moves upward suspension stroke restrictor 316 (i.e. top surface) moves up to 25 mm from the neutral position and further hits the shaft stoppers inner surface, later the drive wheel unit try to get back (as the spring tries to expand) to its neutral position (the drive wheels moves down) uniformly as the pair of rear swivel wheels moves down on the ramp. The shaft stopper 304A-B is placed on the top of spring enclosure by using six hexagonal bolts, the shaft stopper 304A-B include center hole which guides suspension washer's hexagonal nut and also its restrict the suspension shaft 312A-B with suspension washer to coming out from the suspension unit thus by limiting the movement of suspension unit to maximum of ±25 mm.

With reference to FIG. 1A-1D, FIG. 5 illustrates a load transfer in the autonomous mobile robot (AMR) 100, according to embodiments of present disclosure. In an embodiment, there are different standoffs that are fastened on the top plate 102 of the AMR 100. The standoffs in which different material handling units can be mounted by using a plurality of fasteners (e.g., screw, bolt). In an embodiment, material handling includes some weight and the weights are directly coming on the AMR 100 which can leads to lift the AMR 100, therefore the standoffs are placed in a such a way that the load distribution due the weights should be uniform on the AMR 100 and the load effect gets transferred directly to the ground surface which ensures that there is a minimal load effect on the AMR 100. In an embodiment, if the AMR 100 starts to lift from the either side, then that can be taken care by adding the counterweights to balance the AMR 100. The load due to material handling directly acts on the standoffs then to the top plate 102, since the top plate 102 and the chassis 128 is fastened each other the load then transfer to the chassis 128 through the top plate 102 to the chassis 128 then through the chassis 128 the load effect transfer to the wheels, ultimately from the wheels further transferred to the ground. In an embodiment, the plurality of long standoffs are coupled between the top plate (102) and the monolithic chassis (128) to provide more load transfer area for the top plate (102). In an embodiment, the plurality of long standoffs act as locating points for the top plate (102).

With reference to FIG. 1A-1D, the AMR 100 includes a navigation and control unit. The AMR 100 travels according to the navigational system and the drive wheels (130A-B) are placed at a centre of the AMR 100 to control at least one mechanism of the AMR 100 comprising: (i) a forward, (ii) a reverse, (iii) a turning, (iv) a swivelling, and (v) braking. The AMRs navigation system is configured to work with plurality of sensors but not limited to such as a LIDAR, an IMU sensor, encoders, vision, etc. In an embodiment, the plurality of sensors is configured to be mounted on the front cover or the rear cover of the AMR 100, and combination thereof in order to sense any obstacles or path with a range up to a maximum of 360 degrees. For example, there is special space provided in the front cover of the AMR 100 for the LIDAR sensor 122, through which the LIDAR sensor 122 can sense the coverage area and to detect obstacles if any. The AMR 100 also includes four plurality of emergency switches 112A-B (e.g., four emergency switches) provided at four corners to cut down the motion of the AMR 100 in any emergency situation.

In an embodiment, the AMR 100 works with differential drive motion in which each motors are individually controlled, each motor drive system consists of motor with encoder feedback and there are the IMU sensor, Laser scanner, Ultrasonic sensor, etc for robot navigation. The AMR 100 is also connected to external systems through wired and wireless communications. In an embodiment, the AMR navigation and localization is performed with sensor fusion system which takes inputs from all the sensors with odometry and localizes itself. The navigation system adapts to different types of environment by navigating inside warehouse or shop floors etc, and generates a digital map inside a computing platform with-in the AMR 100 or external connected system through wireless or wired interface, or on cloud. In an embodiment, a HMI interface is to display robot related information like errors, warnings, current job, battery status, WI-FI status, etc, and a touch based display which operator interacts.

In an embodiment, a robot controller (not shown in Figure) is a primary top computing platform to the AMR 100 and other add-on peripherals for the AMR 100 such as a Manipulator, a indexing mechanism, a conveyor, etc are connected directly to the robot controller via communication interfaces like Ethernet, WI-FI, etc. which allows the AMR base modular connectivity to the external peripheral interfaces.

In an embodiment, emergency module is interfaced directly to the motor drive controller, any safety breach on the laser defined boundary are taken as emergency command and the robot starts. Collision avoidance is a second level of laser breach defined in software, in which any obstacle comes in that range of zone, the robot slows down and try to avoid by re-routing the AMR movement, this enables the robot to work in a collaborative environment. The AMR navigation system which includes at least one of following: (i) IMU are enabled to get fused odometry data from Laser, wheel encoders and IMU; (ii) a vision system (e.g., camera) is configured for obstacle detection in combination with Laser and ultrasonic sensors; (iii) An array of Ultrasonic sensors and Infrared sensors is configured in case of obstacle detection like transparent surfaces, reflective/non-reflective surfaces.

With reference to FIG. 1A-1D, FIG. 6A is an exemplary view illustrating a Robot/Cobot mounted on the autonomous mobile robot (AMR) to pick and place plurality of objects from one place to another according to embodiments of the present disclosure. The AMR 100 mounted with robot can be used as the plurality of material handling units. The AMR 100 is configured to move from one place to another place whereas the robot specified only for two task i.e. pick and place. The robot also can be placed at certain height using some height blocks/or can be placed on a cobot mounting option 602 where the robot reach required is high. For example, if robot/cobot is placed at some height then there could be lifting of the AMR 100. Then there is a requirement to add the counterweights at the bottom rear side of the chassis 128 to avoid the lifting of the AMR 100. As per the requirement, at least few of the entire stand offs provided on the platform can be used to mount the robot/cobot option on the top of the AMR 100.

Figure 6A:
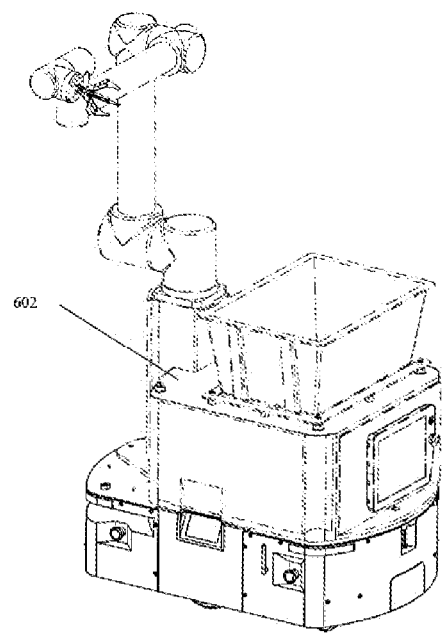
FIG. 6A is an exemplary view illustrating a Robot/Cobot mounted on the AMR to pick and place plurality of objects from one place to another according to embodiments of the present disclosure.
Figure 6B:
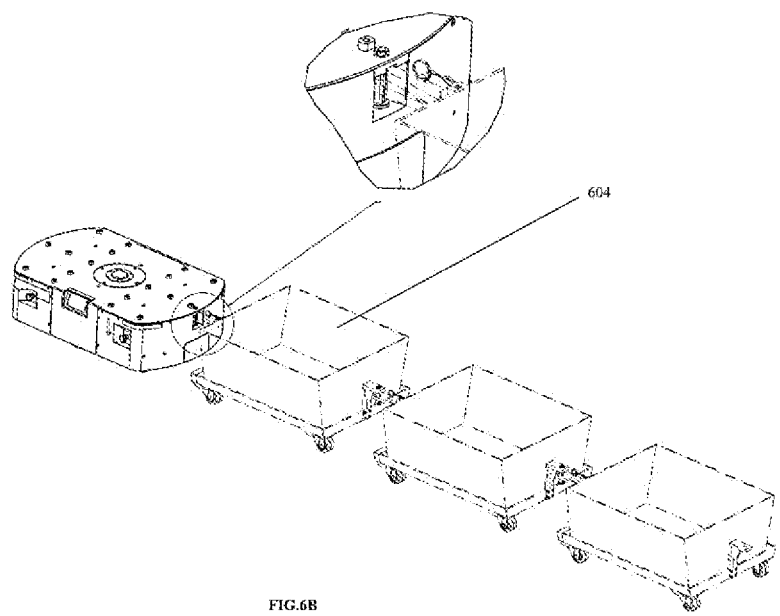
FIG. 6B is an exemplary view illustrating a tugging unit with plurality of carts or trolleys of the modular platform the AMR, according to embodiments of the present disclosure.
Figure 6C:
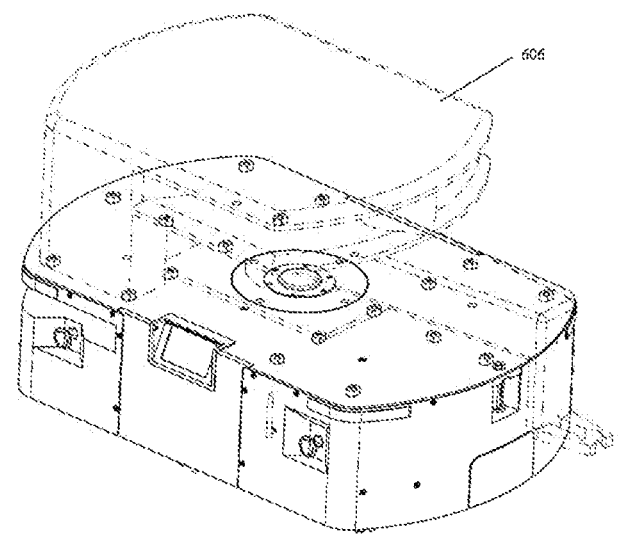
FIG. 6C is an exemplary view illustrating an automated tugging unit on the AMR according to embodiments of the present disclosure.
Figure 6E:
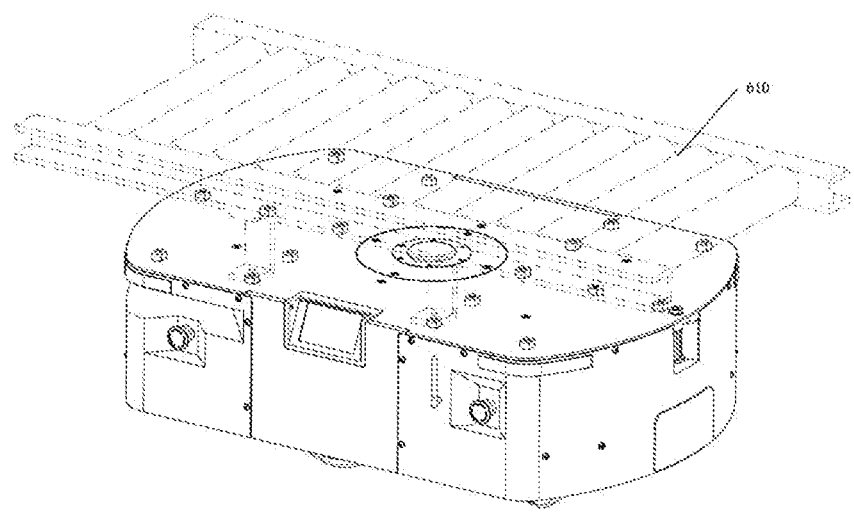
FIG. 6E is an exemplary view illustrating the AMR mounted with a conveyor bed according to embodiments of the present disclosure.
Figure 6F:
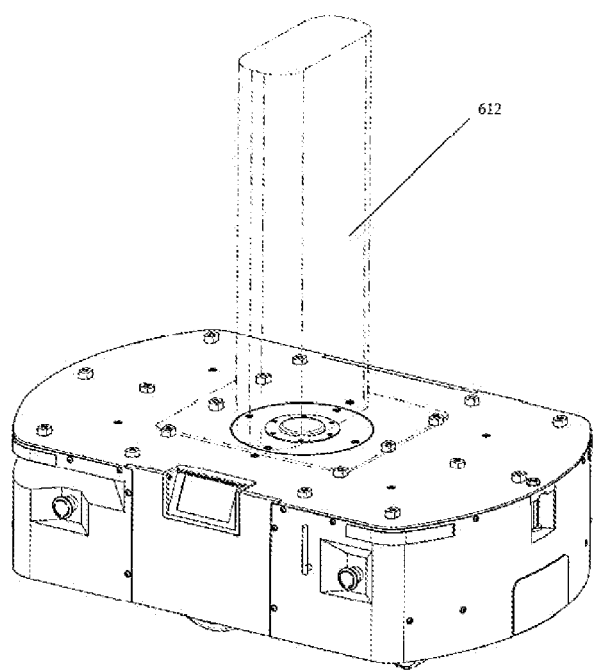
FIG. 6F is an exemplary view illustrating an object identification unit configured to scan and count number of parts/objects being processed according to embodiments of the present disclosure.

With reference to FIG. 1A-1D, FIG. 6B is an exemplary view illustrating a tugging unit attached with plurality of carts or trolleys of the modular platform the AMR, according to embodiments of the present disclosure. FIG. 6B shows the manual tugging in which the train of carts on wheels is attached manually to the tugger pin 118 provided at the rear end of the AMR 100. The tugging can be done manually or automatically based on the requirement. For manual tugging 604 the AMR 100 include the tugging pin 118 at the rear end on which one should tug the carts as required possible numbers depends on AMRs capacity.

With reference to FIG. 1A-1D, FIG. 6C is an exemplary view illustrating the automated tugging unit on the AMR 100 according to embodiments of the present disclosure. The provision for the automatic tugging unit (hook) to mount on the platform of AMR by using the short length standoffs. A AMRs automatic tugging unit 606 is operate by own and there is no manual intervention required during the tugging like manual tugging. A center two rows of short length stand offs can be used to mount automatic tugging unit on the platform of AMR, if required front side row of stand offs also can be used. The counterweights to be added at the bottom of base frame in either side as per requirement to avoid the lifting of the AMR 100.

With reference to FIG. 1A-1D, FIG. 6D is an exemplary view illustrating a Lift and Indexing table unit 608 mounted on the platform of the AMR 100 by using the short length standoffs according to embodiments of the present disclosure. The Lift and Indexing table unit 608 through which the AMR 100 can transfer the different racks from one place to another place in the warehouses. In an embodiment, whole unit can be mount using the center set of short length stand offs of the AMR.

With reference to FIG. 1A-1D, FIG. 6E is an exemplary view illustrating the AMR 100 mounted with a conveyor bed 610 according to embodiments of the present disclosure. In an embodiment, small motorized roller conveyor can be fixed on to the top of the AMR 100. The AMR 100 mounted with the conveyor bed 610 (e.g., Transfer conveyor) can move from one place to another place and able to receive the objects from main roller/belt conveyor and delivers to another place and vice versa. In an embodiment, the AMR 100 is used only for guidance/transport and roller conveyor is used as receiver and transmitter.

With reference to FIG. 1A-1D, FIG. 6F is an exemplary view illustrating the object identification unit 612 required to scan and count number of parts/objects being processed according to embodiments of the present disclosure. In an embodiment, the AMR 100 with scanner can be used for this application, whereas the object identification unit 612 is fixed on to the top of the AMR 100 on certain standoffs.

The embodiments of the present disclosure provide the AMR include a common mobile platform on top of which many manipulators for the required functionalities can be mounted enables consolidation of different required functionalities onto one platform. The base platform being common would give the cost advantage in being able to make in high volumes and less inventory part numbers as compared to individual vehicles catering to different applications. The AMR is configured to provide an automated leveling & index unit during turns and movement on ramps to prevent toppling. The four standoff provides greater stability to the AMR 100. The embodiments of the present disclosure which highlights a common base platform on which all other options would be easily integrated like: (a) Manipulator (Robot+EOAT), (b) Adaptor plate for carrying totes/trays/loads, and (c) Lift & carry racks. The objective is to design a common mobile platform that can perform various tasks without consuming much room of the industry workspace that is being compact. The embodiments of the present disclosure make use of a single modular platform for more than a particular application (e.g., Pick and place, lift and transport, tugging) additional flexibility are achieved. The single modular platform drives down cost of manufacturing substantially since now smaller of part types to handle in order to attend the variety of applications as well as volumes.

The embodiments of the present disclosure in which a load carrying capacity of the mobile platform is constrained by parameters like drive wheel power, strength of the chassis, working area and load capacity of wheels. The design challenge is the optimization for rise in vehicle weight for balancing and drop in vehicle weight for increasing the load carrying. The set of side plates are connected to the chassis to make the chassis very rigid and also to improve the aesthetic look of the AMR and also to hide the drive wheels from exposing to outside. The single modular platform in which one or more swivel wheels are selected to obtain compactness for complete 360-degree rotation without compromising on the load carrying capacity. The chassis is designed to be structurally strong with light weight material e.g., Aluminum, grade being high strength alloy. A safety factor is applied to wheel capacity and designs. After all these considerations, the required load carrying capacity of the vehicle is achieved.

Major parts of the AMR were made up of light weight material like aluminum to reduce weight. Two main casting parts of the AMR i.e. chassis and wheel mount is made up of aluminum to provide the optimum weight which are the major contribution to the entire AMRs weight. By adopting the monolithic chassis, total weight optimization of the AMR is achieved and at the same time number of parts used to form the chassis is reduced to one as name indicates "Monolithic". Cost reduction is a main factor to be achieved by optimizing the overall vehicle weight and reducing the total parts count and without affecting the operable load capacity and the modularization functionality of the AMR. The chassis includes an extra mounting holes at the bottom to add the counterweights to counterbalance the AMR if required in any of the options (material handling units) mounted on the AMR.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:
1. An Autonomous mobile robot (AMR) 100 with a single modular platform to mount plurality of material handling units, comprising:
  a monolithic chassis (128);
  a top plate (102) comprises a plurality of standoffs to mount at least one material handling units, wherein the plurality of standoffs further corresponds to a plurality of short length standoffs (104A-N) and a plurality of long standoffs (106A-N);

the plurality of standoffs are integrated on top of the top plate (102), wherein the top plate (102) is sandwiched between the plurality of standoffs and the monolithic chassis (128), wherein a load is transferred from the plurality of material handling units through the plurality of standoffs and the top plate (102) to the monolithic chassis (128), wherein the plurality of long standoffs (106A-N) are coupled between the top plate (102) and the monolithic chassis (128) to provide more load transfer area for the top plate (102), wherein the plurality of long standoffs (106A-N) act as locating points for the top plate (102);

drive wheels (130A-B) are coupled to a wheel mount (136) as a single unit to form a drive wheel assembly (144);

a suspension unit is coupled symmetrically in between two main bodies which corresponds to the monolithic chassis (128) and the drive wheel assembly (144) with spring enclosures (306A-B), suspension shafts (312A-B) and coil springs (308A-B), wherein the suspension shafts (312A-B) are connected to the wheel mount (136), wherein the wheel mount (136) is rigidly connected to the drive wheels (130A-B) and the spring enclosure (306A-B) are rigidly connected to the monolithic chassis (128), wherein the suspension unit with plurality of linear bearings (302A-D) and a bearing shaft (318) allows the drive wheels (130A-B) to move up and down together as one unit in a vertical direction so that the drive wheels (130A-B) touch ground to produce a driving torque; and a set of side plates (108A-B) connect the monolithic chassis (128) on either side of the AMR 100.

2. The autonomous mobile robot (AMR) 100 of claim 1, wherein a monolithic casting of the monolithic chassis (128) act as a base frame of the AMR 100 with four swivel wheels (134A-D) coupled directly and the drive wheels (130A-B) coupled indirectly with the wheel mount (136).

3. The autonomous mobile robot (AMR) 100 of claim 1, wherein the monolithic chassis (128) is symmetric about X-X and Y-Y axis comprising plurality of ribs (214A-N) to hold the top plate (102), wherein a plurality of ribs (212A-D) is configured to strengthen the four corners of the monolithic chassis (128), wherein the four swivel wheels (134A-D) are coupled to the monolithic chassis (128).

4. The autonomous mobile robot (AMR) 100 of claim 1, wherein the plurality of linear bearings (302A-D) and the suspension unit are connected to the monolithic chassis (128) which is further coupled with the drive wheels (130A-B) through the wheel mount (136).

5. The autonomous mobile robot (AMR) 100 of claim 1, wherein the drive wheels (130A-B) are placed at a centre of the AMR 100 to control at least one mechanism of the AMR 100 comprising: (i) a forward, (ii) a reverse, (iii) a turning, (iv) a swivelling, and (v) braking.

6. The autonomous mobile robot (AMR) 100 of claim 1, wherein the monolithic chassis (128) is rigid, wherein rigidity is provided by connecting the set of side plates (108A-B) and connecting plates (126A-B) at a front side and a rear side.

7. The autonomous mobile robot (AMR) 100 of claim 1, wherein the monolithic chassis (128) consists plurality of circular openings (holes) for at least one cooling fan to provide cooling for at least electric components and drive motors.

8. The autonomous mobile robot (AMR) 100 of claim 1, wherein the top plate (102) comprises a plurality of mounting holes for at least one standoff, wherein the top plate (102) is coupled with the monolithic chassis (128) by plurality of fasteners and located by the plurality of long standoffs (106A-N).

9. The autonomous mobile robot (AMR) 100 of claim 1, wherein counter weight is added at bottom of the AMR 100 based on at least one of: (i) a payload requirement, (ii) position of the material handling units, (iii) plurality of applications, and combination thereof.

10. The autonomous mobile robot (AMR) 100 of claim 1, wherein plurality of shafts are mounted on the wheel mount (136) with the plurality of fasteners from a bottom side, and at other end plurality of centre shafts receive the coil springs (308A-B) and embossed in the spring enclosure (306A-B), wherein remaining plurality of shafts are freely sliding in the plurality of linear bearings (302A-D) if suspension is actuated.

11. The autonomous mobile robot (AMR) 100 of claim 1, wherein the coil springs (308A-B) is placed in between two rigid links, wherein the two rigid links refer to the suspension shaft (312A-B) and the spring enclosures (306A-B), which creates a damping action of the AMR 100.

12. The autonomous mobile robot (AMR) 100 of claim 1, wherein at least one of a robot or a cobot is placed on the modular platform of the AMR 100 to pick and place at least one object from one location to another location.

13. The autonomous mobile robot (AMR) 100 of claim 1, wherein a tugger pin (118) is mounted on the top plate (102) of the monolithic chassis (128) to attach at least one cart.

14. The autonomous mobile robot (AMR) 100 of claim 1, wherein an automatic tugging unit (hook) (606) is mounted through the plurality of standoffs on the top plate (102) to automatically attach at least one cart.

15. The autonomous mobile robot (AMR) 100 of claim 1, wherein a Lift and Indexing table unit (608) is mounted through the plurality of standoffs of the AMR 100 to transfer plurality of racks from one location to another location.

16. The autonomous mobile robot (AMR) 100 of claim 1, wherein a transfer conveyor (610) is mounted through the plurality of standoffs of the AMR 100 to deliver plurality of objects from one location to another location.

17. The autonomous mobile robot (AMR) 100 of claim 1, wherein an object identification unit (612) is mounted through the plurality of standoffs of the AMR 100 to scan the plurality of objects.

* * * * *